United States Patent
Holtzman et al.

(10) Patent No.: US 6,310,869 B1
(45) Date of Patent: Oct. 30, 2001

(54) METHOD AND APPARATUS FOR REDUCING AMPLITUDE VARIATIONS AND INTERFERENCE IN COMMUNICATION SIGNALS, SUCH AS IN WIRELESS COMMUNICATION SIGNALS EMPLOYING INSERTED PILOT SYMBOLS

(75) Inventors: Jack Holtzman; Daisuke Terasawa; Leonid Razoumov, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/144,402

(22) Filed: Aug. 31, 1998

(51) Int. Cl.$^7$ ........................................... H04J 13/00
(52) U.S. Cl. ............................ 370/335; 370/342
(58) Field of Search ................... 370/335, 342; 375/144, 145, 148

(56) References Cited

U.S. PATENT DOCUMENTS

| | | | |
|---|---|---|---|
| 4,901,307 | 2/1990 | Gilhousen et al. | 370/18 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,497,395 * | 3/1996 | Jou | 375/205 |
| 5,602,833 | 2/1997 | Zehavi | 370/209 |
| 5,668,806 | 9/1997 | Arai et al. | |
| 5,742,595 | 4/1998 | Bhagalia | |
| 5,793,797 | 8/1998 | Giallorenzi et al. | |
| 5,896,374 * | 4/1999 | Okumura et al. | 370/311 |

FOREIGN PATENT DOCUMENTS

| | | |
|---|---|---|
| 0851601 | 12/1997 | (EP) . |
| 9818217 | 4/1998 | (WO) . |

* cited by examiner

*Primary Examiner*—Melvin Marcelo
(74) *Attorney, Agent, or Firm*—Philip Wadsworth; Kent D. Baker; Pavel Kalousek

(57) ABSTRACT

Several methods and corresponding apparatus reduce peak to average power in signals transmitted in a wireless communications system, particularly with respect to pilot symbols transmitted from a base station to several user stations. A large peak to average amplitude of inserted pilot symbols has been found to result from a common sign chip position that exists in orthogonal codes, such as Walsh codes. In a first embodiment, the Walsh codes are multiplied by a random value of ±1. Under a second embodiment, the common sign chip position is eliminated in each Walsh code. The user station then inserts the missing chip position to regain orthogonality. In a third embodiment, the base station transmits pilot symbols, on a separate pilot channel, in only symbol positions that user stations expect to find pilot symbols. Under a fourth embodiment, each Walsh code is randomly shifted.

45 Claims, 9 Drawing Sheets

$H128 =$

|    | 0 | 1  | 2  | 3  | 4  | 5  | 6  | 7  | 8  | 9  | 10 | 11 |
|----|---|----|----|----|----|----|----|----|----|----|----|----|
| 0  | 1 | 1  | 1  | 1  | 1  | 1  | 1  | 1  | 1  | 1  | 1  | 1  |
| 1  | 1 | -1 | 1  | -1 | 1  | -1 | 1  | -1 | 1  | -1 | 1  | -1 |
| 2  | 1 | 1  | -1 | -1 | 1  | 1  | -1 | -1 | 1  | 1  | -1 | -1 |
| 3  | 1 | -1 | -1 | 1  | 1  | -1 | -1 | 1  | 1  | -1 | -1 | 1  |
| 4  | 1 | 1  | 1  | 1  | -1 | -1 | -1 | -1 | 1  | 1  | 1  | 1  |
| 5  | 1 | -1 | 1  | -1 | -1 | 1  | -1 | 1  | 1  | -1 | 1  | -1 |
| 6  | 1 | 1  | -1 | -1 | -1 | -1 | 1  | 1  | 1  | 1  | -1 | -1 |
| 7  | 1 | -1 | -1 | 1  | -1 | 1  | 1  | -1 | 1  | -1 | -1 | 1  |
| 8  | 1 | 1  | 1  | 1  | 1  | 1  | 1  | 1  | -1 | -1 | -1 | -1 |
| 9  | 1 | -1 | 1  | -1 | 1  | -1 | 1  | -1 | -1 | 1  | -1 | 1  |
| 10 | 1 | 1  | -1 | -1 | 1  | 1  | -1 | -1 | -1 | -1 | 1  | 1  |
| 11 | 1 | -1 | -1 | 1  | 1  | -1 | -1 | 1  | -1 | 1  | 1  | -1 |
| 12 | 1 | 1  | 1  | 1  | -1 | -1 | -1 | -1 | -1 | -1 | -1 | -1 |
| 13 | 1 | -1 | 1  | -1 | -1 | 1  | -1 | 1  | -1 | 1  | -1 | 1  |
| 14 | 1 | 1  | -1 | -1 | -1 | -1 | 1  | 1  | -1 | -1 | 1  | 1  |

FIG. 3

$SUMKTERMSCOLJ =$

|    |   |    |    |    |    |    |    |    |    |    |    |    |
|----|---|----|----|----|----|----|----|----|----|----|----|----|
| 1  | 1 | 1  | 1  | 1  | 1  | 1  | 1  | 1  | 1  | 1  | 1  | 1  |
| 2  | 0 | 2  | 0  | 2  | 0  | 2  | 0  | 2  | 0  | 2  | 0  | 2  | 0  |
| 3  | 1 | 1  | -1 | 3  | 1  | 1  | -1 | 3  | 1  | 1  | -1 | 3  | 1  |
| 4  | 0 | 0  | 0  | 4  | 0  | 0  | 0  | 4  | 0  | 0  | 0  | 4  | 0  |
| 5  | 1 | 1  | 1  | 3  | -1 | -1 | -1 | 5  | 1  | 1  | 1  | 3  | -1 |
| 6  | 0 | 2  | 0  | 2  | 0  | -2 | 0  | 6  | 0  | 2  | 0  | 2  | 0  |
| 7  | 1 | 1  | -1 | 1  | -1 | -1 | 1  | 7  | 1  | 1  | -1 | 1  | -1 |
| 8  | 0 | 0  | 0  | 0  | 0  | 0  | 0  | 8  | 0  | 0  | 0  | 0  | 0  |
| 9  | 1 | 1  | 1  | 1  | 1  | 1  | 1  | 7  | -1 | -1 | -1 | -1 | -1 |
| 10 | 0 | 2  | 0  | 2  | 0  | 2  | 0  | 6  | 0  | -2 | 0  | -2 | 0  |
| 11 | 1 | 1  | -1 | 3  | 1  | 1  | -1 | 5  | -1 | -1 | 1  | -3 | -1 |
| 12 | 0 | 0  | 0  | 4  | 0  | 0  | 0  | 4  | 0  | 0  | 0  | -4 | 0  |
| 13 | 1 | 1  | 1  | 3  | -1 | -1 | -1 | 3  | -1 | -1 | -1 | -3 | 1  |
| 14 | 0 | 2  | 0  | 2  | 0  | -2 | 0  | 2  | 0  | -2 | 0  | -2 | 0  |
| 15 | 1 | 1  | -1 | 1  | -1 | -1 | 1  | 1  | -1 | -1 | 1  | -1 | 1  |
| 16 | 0 | 0  | 0  | 0  | 0  | 0  | 0  | 0  | 0  | 0  | 0  | 0  | 0  |

FIG. 4

METHOD AND APPARATUS FOR REDUCING AMPLITUDE VARIATIONS AND INTERFERENCE IN COMMUNICATION SIGNALS, SUCH AS IN WIRELESS COMMUNICATION SIGNALS EMPLOYING INSERTED PILOT SYMBOLS

BACKGROUND OF THE INVENTION

I. Field of the Invention

The invention relates to communication systems. More particularly, the invention relates to methods and apparatus for reducing amplitude and interference in wireless communication systems using inserted pilot symbols.

II. Description of the Related Art

Several multiple access communication techniques are known in the art, such as time division multiple access (TDMA) and frequency division multiple access (FDMA). However, the spread spectrum modulation techniques of code division multiple access (CDMA) provide significant advantages over other multiple access modulation techniques. CDMA techniques in a communication system are disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING SIGNAL WAVEFORMS IN A CDMA CELLULAR TELEPHONE SYSTEM," both assigned to the assignee of the present invention.

CDMA modulation techniques provide capacity improvements over other techniques based in part on CDMA's use of orthogonal functions. The CDMA codes are generated by, e.g., Walsh functions that mathematically form an orthogonal set Thus, any two Walsh functions are orthogonal to each other, and signals encoded with two separate Walsh functions should cause no mutual interference if they are time aligned. An example of Walsh functions employed in a CDMA communication system is disclosed in U.S. Pat. No. 5,602,833, entitled "METHOD AND APPARATUS FOR USING WALSH SHIFT KEYING IN A SPREAD SPECTRUM COMMUNICATION SYSTEM," assigned to the assignee of the present invention.

Since CDMA employs a wideband signal, it spreads the signal energy over a wide bandwidth. Therefore, frequency selective fading affects only a small part of the CDMA signal bandwidth. CDMA also provides space or path diversity through multiple signal paths that simultaneously link a mobile station or user with two or more cell-sites. Furthermore, CDMA can exploit the multipath environment by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention.

Under one CDMA standard, described in the Telecommunications Industry Association's *TIA/EIA/IS-95-A Mobile Stations-Base Station Compatibility Standard for Dual-Mode Wideband Spread Spectrum Cellular System*, each base station transmits pilot, sync, paging and forward traffic channels to its users. The pilot channel is an unmodulated, direct-sequence spread spectrum signal transmitted continuously by each base station. The pilot channel allows each user to acquire the timing of the channels transmitted by the base station, and provides a phase reference for coherent demodulation. The pilot channel also provides a means for signal strength comparisons between base stations to determine when to hand off between base stations (such as when moving between cells).

CDMA modulation techniques require that all transmitters be under precise power control to manage interference in the system. If the transmission power of signals transmitted by a base station to a user (the forward link) are too high, it can create problems such as interfering with other users. As a result, most base stations have a fixed amount of power at which to transmit signals, and therefore can transmit to only a limited number of users. Alternatively, if the transmission power of signals transmitted by the base station is too low, then some users can receive multiple erroneous transmitted frames. Terrestrial channel fading and other known factors also affect the transmission power of signals transmitted by the base station. Thus, each base station needs to adjust the transmission power of the signals it transmits to its users. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention.

Recent CDMA modulation techniques have been proposed using dedicated time multiplexed ("DTMP") pilot symbols. Under the DTMP approach, separate pilot symbols are time multiplexed on each user's traffic channel. Each user sequentially de-spreads the pilot symbols (and information symbols). Under an alternative common code multiplexed pilot ("CCMP") approach, one co-channel is dedicated to broadcasting a pilot signal. No pilot symbols are multiplexed with dedicated channels, and all users de-spread both the pilot symbols and the modulated information signals in parallel.

Under the DTMP approach, the base station must employ a fraction of its total power for pilot symbols and pilot data for each user. The total amount of power required for the pilot symbols and pilot data is based on a sum of the power required for all pilot symbols and pilot data for all of the base station's users. The CCMP approach need only allocate a fraction of its total power to the common pilot based on a maximum pilot power required by the "worst-case" user. Additionally, the DTMP approach may suffer from further shortcomings.

SUMMARY OF THE INVENTION

The inventors have found that, with inserted pilot symbols (as opposed to a common, continuous pilot signal), the pilot symbols transmitted to different mobile stations or users in the DTMP approach add linearly and cause large peak to average amplitude variations. Such amplitude variations require either large power amplifiers and/or cause interference in the system. As explained more fully below, a sign or value is identical in one position of each orthogonal code assigned to concurrent users (the "common sign chip position"), which can linearly add to produce a large amplitude.

The inventors have identified at least four classes of solutions to this problem. Under a first solution, the base station multiplies the signals of each user by a plus or minus random variable or phase rotation between 0 and 360 degrees, such as 0 or 180 degrees. The orthogonality of the codes is still maintained between the orthogonal functions, but the value of the common sign chip position of some codes is varied. The user station can determine the value of the random variable by either observing the sign of the Walsh demodulation, or by receiving additional data sent from the base station.

Under a second class of solutions, the base station transmits empty symbols or chips in the common sign position of each orthogonal function. The user station then reinserts the missing chip after receiving the remainder of the orthogonal function sequence. The user station can reconstruct the first chip with the Walsh functions. For example, if all the transmitted Walsh functions would sum to 0 if fully sent, then the user station sums all of the received Walsh functions (without the first chips) over all the Walsh chips. The negative of this sum is the value that the received signal would have had if the Walsh functions were fully transmitted. If one of the Walsh functions did not sum to 0 (for example, all chips were equal to 1), then a first Walsh demodulation of all the received Walsh functions provides simultaneous equations for solving for the first Walsh chip amplitudes.

Under a third class of solutions, instead of providing each user station with its own pilot symbols, the base station first identifies symbol positions common to different users. For example, four users may expect to receive a pilot symbol in symbol position six. Instead of transmitting four separate pilot symbols, the base station only transmits one pilot symbol to be used by all four users. This is a hybrid DTMP and CCMP approach. Individual pilot symbols are effectively shared or combined among users to provide the pilot symbols required for all user stations. Pilot symbols are not sent in symbol positions where no user station expects to find any pilot symbol. Not only does this third class of solutions reduce the peak to average amplitude problem, but also reduces the number of symbols transmitted, to thereby reduce interference among transmitted channels.

Under a fourth class of solutions, the base station shifts each orthogonal code by a random amount. The user station receives information regarding the random shifts for each channel to thereby unshift the channels and retain the orthogonality. Such random shifts effectively "shuffle" the common sign chip position in the orthogonal codes, thereby reducing the peak to average amplitude problem noted above.

In a broad sense, one aspect of the invention is for use in a communication system having a base station and several user stations that exchange communication signals with the base station. A method for reducing transmission signal power of transmitted communication signals includes: (a) receiving channel data for transmission on several channels, wherein the channel data includes pilot symbol data; (b) combining orthogonal codes with the received channel data, wherein each orthogonal code has at least one common chip position, and wherein the common chip position has a same value for each orthogonal code; and (c) before transmitting the channel data combined with the orthogonal codes, altering the common chip position of at least one of the orthogonal codes to reduce a combined amplitude resulting from simultaneous transmission and addition of the common chip position for the several channels.

Under another aspect of the invention, a method includes: (a) receiving channel data for transmission on several channels to several user stations, wherein the channel data includes pilot symbol data; (b) determining symbol positions in which each of the several user stations expect to find pilot symbols; and (c) transmitting to the several user stations pilot symbols only in symbol positions that the several user stations expect to find pilot symbols, and failing to transmit pilot symbols in other symbol positions.

In yet another aspect of the invention, a user station includes a receiver and a processor. The user station is for use in a communications system having a base station and several other user stations. All of the user stations exchange communication signals with the base station. The receiver receives channel data from one of several channels, wherein the channel data includes pilot symbol data encoded with one of several orthogonal codes, and wherein each orthogonal code has at least one common chip position. The common chip position has a same value for each orthogonal code. The common chip position of the one received orthogonal code is altered. The processor, which is coupled to the receiver, returns the altered one orthogonal code to an original state.

BRIEF DESCRIPTION OF THE DRAWINGS

In the figures, like reference numbers identify similar elements. For ease in identifying the discussion of any particular element, the most significant digit in a reference number refers to the figure number in which that element is first introduced (e.g., element 204 is first introduced and discussed with respect to FIG. 2).

FIG. 3 is a table showing an upper left corner of a Walsh matrix of dimension 128.

FIG. 4 is a table showing a cumulative summation of rows of the Walsh matrix of FIG 3.

DETAILED DESCRIPTION OF THE PREFERRED EMBODIMENTS

A communication system, and in particular, an apparatus and method for controlling power and signal interference in the system, is described in detail herein. In the following description, numerous specific details are provided to give a thorough understanding of the invention. One skilled in the relevant art, however, will readily recognize that the invention can be practiced without these specific details, or with alternative elements or steps. In other instances, well-known structures and methods are not shown in detail to avoid obscuring the invention.

Figure 1:
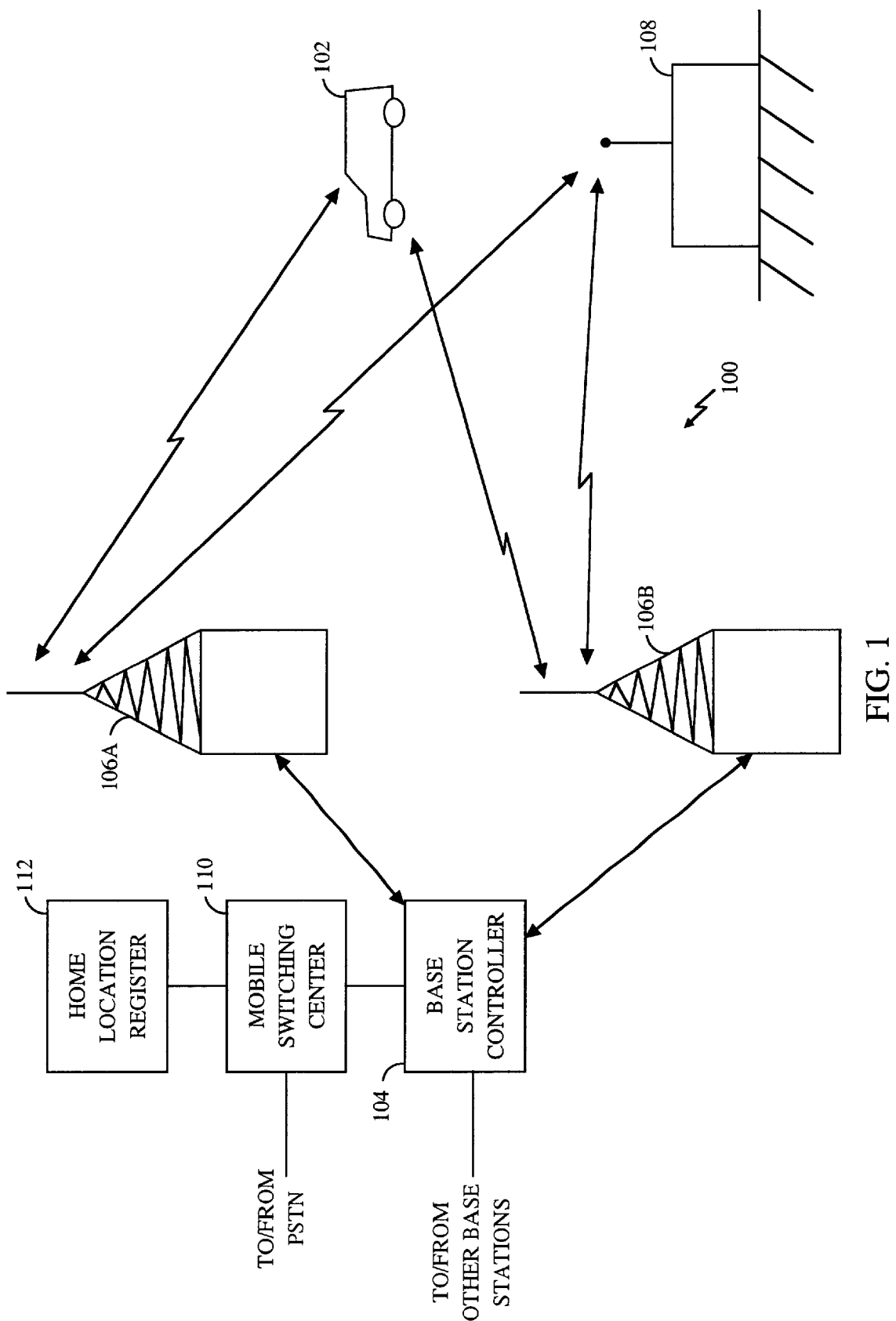
FIG. 1 illustrates a wireless communications system employing the invention.

FIG. 1 illustrates an exemplary cellular subscriber communication system 100, which uses multiple access techniques such as CDMA for communicating between users of user stations (eg., mobile telephones) and cell-sites or base stations. In FIG. 1, a mobile user station 102 communicates with a base station controller 104 by means of one or more base stations 106a, 106b, etc. Similarly, a fixed user station 108 communicates with the base station controller 104, but by means of only one or more predetermined and proximate base stations, such as the base stations 106a and 106b.

The base station controller 104 is coupled to and typically includes interface and processing circuitry for providing system control to the base stations 106a and 106b. The base station controller 104 may also be coupled to and communicate with other base stations, and possibly even other base station controllers. The base station controller 104 is coupled to a mobile switching center 110, which in turn is coupled to a home location register 112. During registration of each user station at the beginning of each call, the base station controller 104 and the mobile switching center 110 compare registration signals received from the user stations to data contained in the home location register 112, as is known in the art. Soft handoffs may occur between the base station controller 104 and other base controllers, and even between the mobile switching center 110 and other mobile switching centers, as is known by those skilled in the art.

When the system 100 processes telephone or data traffic calls, the base station controller 104 establishes, maintains and terminates the wireless link with the mobile station 102 and the fixed station 108, while the mobile switching center 110 establishes, maintains and terminates communications with a public switched telephone network (PSTN). While the discussion below focuses on signals transmitted between the base station 106a and the mobile station 102, those skilled in the art will recognize that the discussion equally applies to other base stations, and to the fixed station 108.

Figure 2:
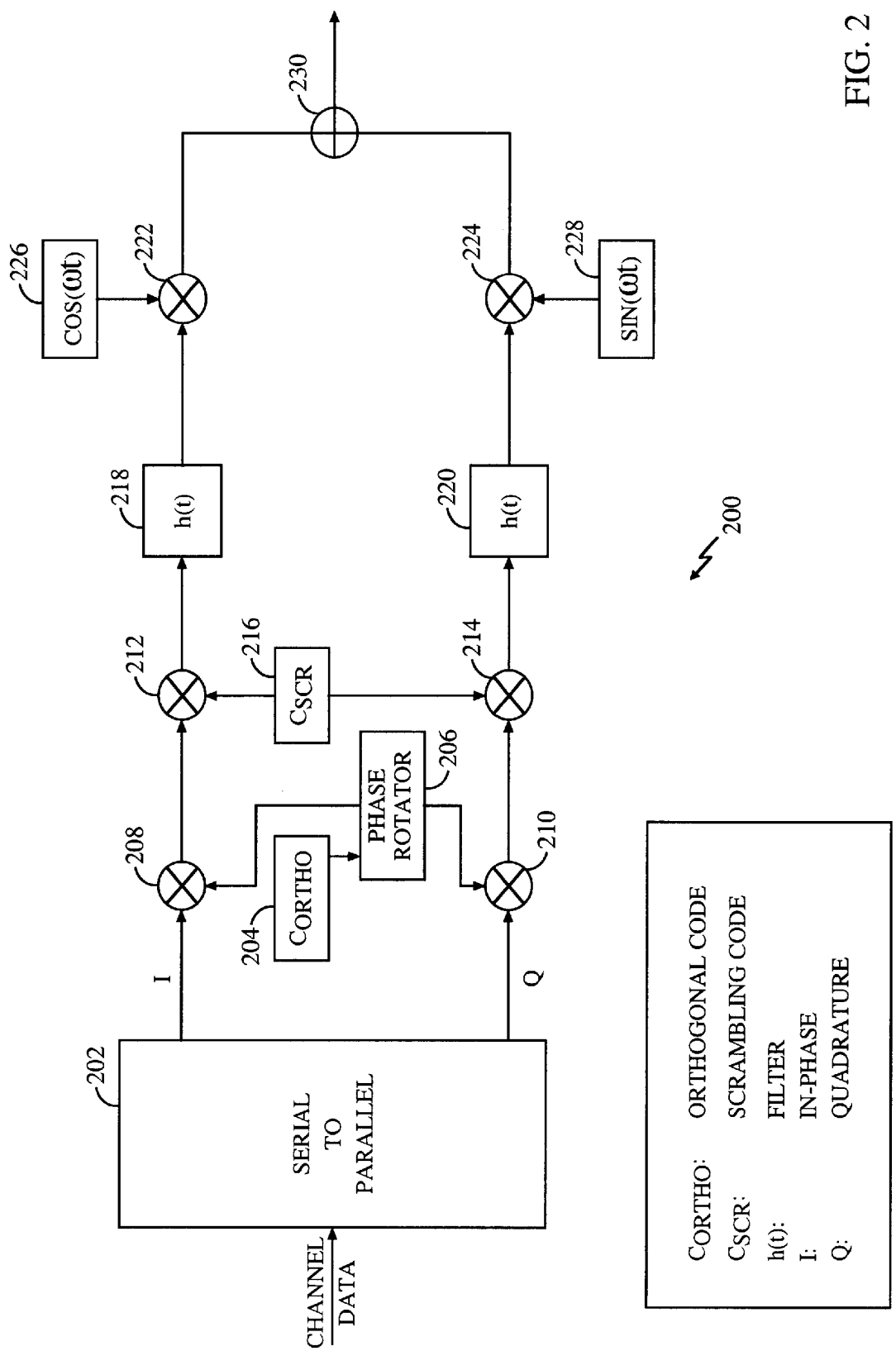
FIG. 2 is a block diagram of a portion of a base station in the wireless communication system of FIG. 1, appropriate for the first class of solutions.

Referring to FIG. 2, a modulator and encoder 200 for use in the base station 106a includes a serial to parallel converter 2 02 that receives a serial stream of channel data and outputs a parallel stream of data on in-phase ("I") and quadrature ("Q") channels. An orthogonal code generator 204 generates orthogonal codes, such as Walsh codes. As described more thoroughly below, a phase rotator 206 generates a different phase rotation between 0 and 360 for Walsh codes output from the orthogonal code generator 204. For example, under a simpler embodiment, the phase rotator 206 generates phase rotations of 0 or 180 degrees. As a result, the phase rotator 206 randomly multiplies a plus or minus one value to the Walsh codes. While the phase rotator 206 is shown coupled to the orthogonal code generator 204, the phase rotator can be coupled to other elements in the encoder 200.

A first pair of multipliers 208 and 210 multiply the randomly inverted Walsh codes with the in-phase and quadrature signals, respectively. Importantly, the channel data input to the modulator 200 includes inserted pilot symbols to which orthogonal codes from the orthogonal code generator 204 are multiplied. In all orthogonal codes, at least one row or column in a matrix of orthogonal codes have the same sign (the "common sign chip position"). The pilot symbols typically include a series of +1 values for all chip positions for the symbol. Thus, without the phase rotator 206, the plus one value pilot symbols for multiple mobile stations would add together to increase the peak to average amplitude, when the common sign chip positions of the orthogonal codes are aligned, as described below.

A second pair of multipliers 212 and 214 multiply a scrambling code, output from a scrambling code generator 216, to the signals output from the multipliers 208 and 210, respectively. While only one channel is shown, the encoder 200 combines signals from all Walsh channels (with some gain on each channel) before being scrambled or spread by the scrambling code generator 216. A pair of filters 218 and 220, such as pulse filters, filter the outputs from the multipliers 212 and 214 on the in-phase and quadrature channels, respectively. A third pair of multipliers 222 and 224 multiply the filtered signals with carrier frequencies provided by cos ($\omega$t) and sin ($\omega$t) generators 226 and 228 on the in-phase and quadrature channels, respectively. Finally, an adder 230 adds the signals from the third pair of multipliers 222 and 224, prior to amplification and transmission to the mobile station 102.

Unless described otherwise herein, the construction and operation of the various blocks shown in FIGS. 1, 2 and the other figures are of conventional design and operation. Thus, such blocks need not be described in further detail, because they will be understood by those skilled in the relevant art. Any additional description is omitted for brevity and to avoid obscuring the detailed description of the invention. Any modifications necessary to the blocks of the communication system 100 of FIG. 1, the encoder 200 of FIG. 2, or other systems can be readily made by one skilled in the relevant art based on the detailed description provided herein.

Referring to FIG. 3, a portion of the first 14 rows and 11 columns of a Walsh 128 matrix is shown, which reflects an example of orthogonal codes generated by the orthogonal code generator 204. As shown in FIG. 3, the first chip position (ie., first column) contains all "1" values. Other orthogonal codes may employ matrices having a common sign chip position that is not necessarily in the first column (i.e., not in the first chip position).

Referring to FIG. 4, it is assumed that equal power is used for each mobile station as an illustrative example, but similar conclusions can be drawn from the following example for a more realistic case of sending different power to each user station. Importantly, the first Walsh chips add linearly. The k'th row is the sum of the first (k+1) rows in the Walsh matrix, which corresponds to (k+1) pilot symbols of different mobile stations being added. Thus, assuming proper alignment of pilot symbols, the first Walsh chips add to a value of 16 with 16 mobile stations. As shown below, the power of the first Walsh chip position grows approximately at the square of an N number of mobile stations, while the variance from all channels grows linearly with N, thereby making results worse as N increases. While greater smoothing of amplitude results as N increases, an increase in N is found to only offset the linear growth in amplitude.

The inventors have not only identified a problem with inserted pilot symbols, but have quantified such problem as follows. An example of such quantification assumes that each frame includes 16 slots, a full rate call has slots consisting of four pilot symbols, one power control bit and 15 data symbols, while ⅛ rate calls include four pilot symbols, one power control bit, two data symbols and 13 empty symbols transmitted randomly as bursts relative to each other. Calls are allocated frame (and slot) offset positions with a resolution of one symbol. For convenience, a reference slot has zero offset and all ⅛ rate calls have slot offsets of 0–19 relative to the reference slot. Mathematically, let x18=a number of ⅛ rate calls set up by the mobile station's own base station x1f=a number of full rate calls set up by the mobile station's own base station x28=a number of ⅛ rate calls serviced by the base station, but set up in another base station x2f=a number of full rate calls serviced by the base station, but set up in another base station $x18_i$=a number of ⅛ rate calls set up by the mobile station's own base station with offset i $y18_i$=a number of ⅛ rate calls set up by the mobile station's own base station that have symbols in offset i, etc.

All calls set up by another base station ("2-calls") are placed randomly in the 20 offsets. For all calls set up by the mobile station's own base station ("1-calls"), the base station picks offsets, when the calls are originated, to minimize the interference with ⅛ rate calls, in a manner discussed below.

The total number of call symbols in a symbol position i is determined as follows. The full rate calls occupy all the symbol positions, while the number of ⅛ rate calls, which have offsets of i-6, i-5, i-4, i-3, i-2, i-1, i, have symbols between calls overlapping in position i. When i-j<0, such symbols are assumed to result from a burst initiating in a previous slot. Hence, $$y18_i = \sum_{j=0}^{i} x18_{i-j} + \sum_{j=i+1}^{6} x18_{20+i-j}, \, i = 0, \ldots, 6$$

$$y18_i = \sum_{j=0}^{6} x18_{i-j}, \, i = 7, \ldots, 19$$

and similarly for the other cases.

The signal x for N channels can be well modelled with a Gaussian approximation. The I and Q components after multiplying by dependent ±1 sequences $a_1$ and $a_Q$ are $x_1 = a_Q x$ and $X_Q = a_Q x$. The squared envelope is $$A^2 = x_1^2 + x_Q^2$$

Then, $$P\{10\log A^2 > \varepsilon\} = P\{10\log(2x^2) > \varepsilon\} = P\left\{x^2 > \frac{10^{\varepsilon/10}}{2}\right\}$$

Now, $x^2$ is a non-central Chi-squared random variable with non-centrality parameter p.

For one ⅛ rate call normalized to unit amplitude for all symbols, there are 4 pilot symbols of constant sign and 3 other symbols of ±1. If a given position is occupied, the mean and variance for a particular symbol position are $\mu=4/7$ and $\sigma^2=1-16/49$, respectively. Similarly, for a full rate call with four pilot symbols of constant sign, the mean and variance respectively are $\mu=4/20$ and $\sigma^2=1=\mu^2$. For fixed y8 and yf calls in a particular symbol position, where y8=y18+y28 and yf=y1f+y2f, the mean and variance in a particular symbol position is $\mu=4/7*y8+4/5*yf$ and $\sigma^2=y8\,(1-16/49)+yf\,(1-4/25)$, respectively. Using the Chi-squared approximation for a fixed number of calls, $$P\{10\log A^2 > \varepsilon\} = \sum_{y8}\sum_{yf} P\{10\log A^2 > \varepsilon \mid \mu(y8, yf), \sigma^2(y8, yf)\} p(y8, yf)$$

where p(y8, yf) is the joint probability mass function of those random variables.

Figure 5:
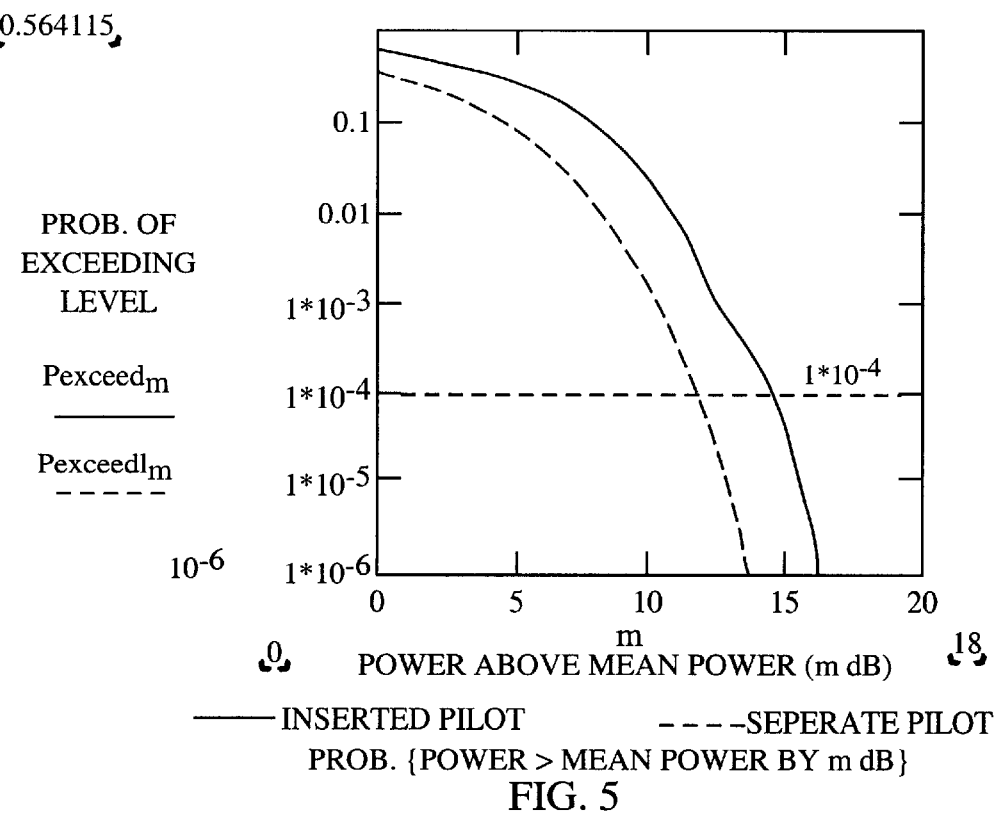
FIG. 5 is a graph showing the probability of an amplitude exceeding a mean square amplitude for inserted pilot symbols, as compared to a power of a separate pilot channel, all based on 20 simultaneous calls.
Figure 6:
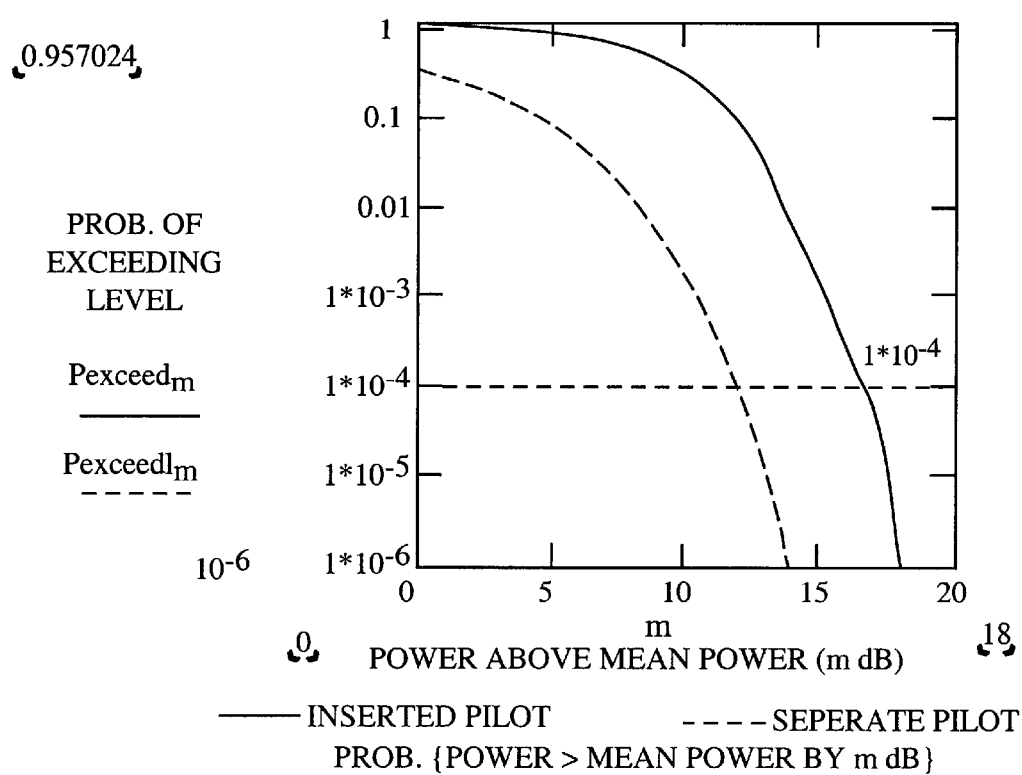
FIG. 6 is a graph showing the probability of an amplitude exceeding a mean square amplitude for inserted pilot symbols, as compared to a power of a separate pilot channel, all based on 120 simultaneous calls.

Constructing a simulation based on the above mathematical results, the graphs of FIGS. 5 and 6 were produced. Under the simulation, the following assumptions were made:

(1) all calls arrive randomly (Poisson);

(2) for a fixed number of calls, each arriving call terminates a call of the same type (e.g., new ⅛ rate call terminates an existing ⅛ rate call);

(3) for a random number of calls, calls terminate randomly (exponential holding times);

(4) 2-calls are randomly assigned an offset;

(5) 1-calls are assigned an offset to provide a minimum sum of 1- and 2-symbols, y18+y1f+y28+y2f;

(6) full-rate calls become ⅛ rate and vice versa at a selected rate;

(7) a fixed number of 1- and 2-calls are used;

(8) transaction rates are set so that calls spend an equal amount of time, on average, as full or ⅛ rate calls;

(9) the average number of each type of call (18, 1f, 28, 2f) is 5 or 30 (i.e., the total number of calls N=20 or 120); and

(10) all symbols, pilot and otherwise, have the same amplitude.

As shown in FIGS. 5 and 6, the amplitudes of inserted pilot symbols add to thereby increase the peak to average power ratio for a number N equal to 20 and 120 calls, respectively. At a statistically reasonable probability of $1\times10^{-4}$, the peak to average ratio of inserted pilot symbols is approximately 15 and 17 dB as shown in FIGS. 5 and 6, respectively. This compares to a ratio of about 12 dB for a separate pilot transmitted continuously at the full rate (shown as the dotted line graph in FIGS. 5 and 6).

As noted above, this peak to average ratio increase results from the common sign chip position in orthogonal codes used in CDMA coding. To attenuate this peak to average increase, under a first class of solutions, the modulator 200 of FIG. 2 employs the phase rotator 206 to randomly multiply a plus or minus one value to the orthogonal codes output from the orthogonal code generator 204. For example, assume that three calls are assigned Walsh codes 1 1 -1 -1 1 1 -1 -1 . . . , 1 1 -1 -1 -1 -1 1 1 1 1 -1 -1 . . . , and 1 -1 1 -1 1 -1 1 -1 . . . , corresponding respectively to rows 2, 6 and 13 of the Walsh matrix of FIG. 3. Assuming the phase rotator 206 multiplies the values of −1, −1 and 1 to the three codes, the following altered Walsh codes result: -1 -1 1 1 1 -1 -1 1 -1 1 1 1 . . . , -1 -1 1 1 1 1 1 -1 -1 -1 -1 1 1 1 . . . , and 1 -1 1 -1 1 -1 1 -1 1 -1 1 . . . . As can be seen in this example with just three calls, the first chip position for the first two calls have their one value changed to −1. When such altered Walsh codes are multiplied with pilot symbols for concurrent calls, such pilot symbols will not provide as large an amplitude when aligned and added.

The orthogonal code generator 204 can algorithmically generate the orthogonal codes, such as the Walsh codes. The phase rotator 206 can be a pseudorandom number generator.

Alternatively, the orthogonal code generator 204 and phase rotator 206 can be combined to form a single unit that randomly generates orthogonal codes having phase variations. In another alternative, the orthogonal code generator 204 can be a stored table of orthogonal codes.

The base station 106a provides an arbitrary phase offset for each channel, including the channels received by the mobile station 102. The mobile station 102 decodes the data symbols by comparing them to the phase of the received pilot symbols. The mobile station 102 does not necessarily determine the original phase of the orthogonal code (before being multiplied by a plus or minus one from the phase rotator 206), but instead determines the relative phase offset between the pilot symbols and the data symbols. The mobile station 102 multiplies all received symbols in a channel with the same multiplier, and the relative phase offset is preserved.

Figure 7:
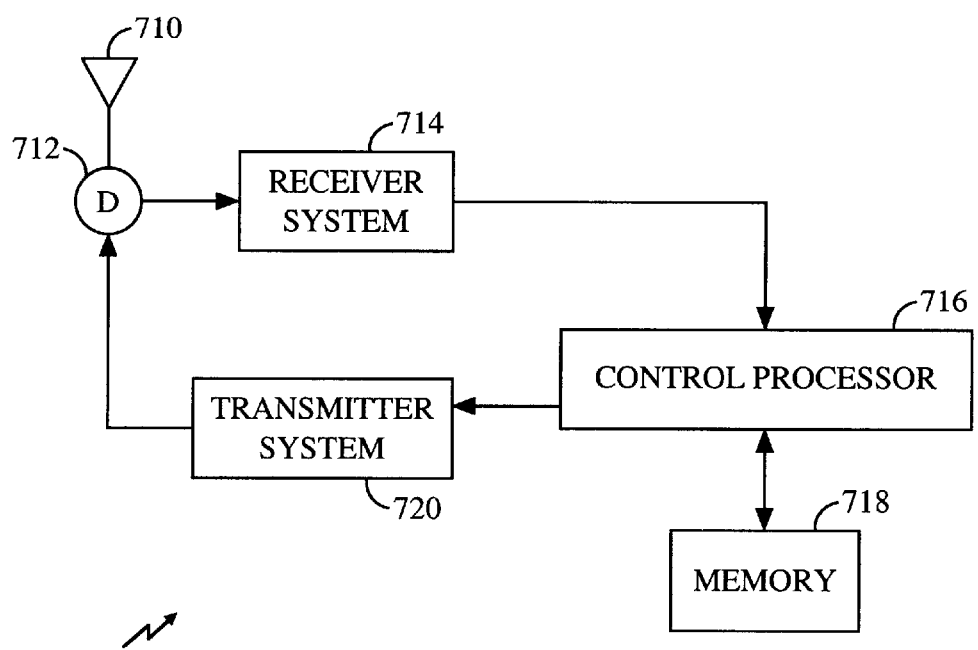
FIG. 7 is a block diagram of a mobile station in the wireless communication system of FIG. 1.

Referring to FIG. 7, an example of the mobile station 102 includes an antenna 710 that transmits signals to, and receives signals from, the base station 106a. A duplexer 712 provides a forward link channel or signal from the base station 106a to a receiver system 714. The receiver system 714 performs much of the demodulation and decoding of the receiver forward link channel. For example, the receiver system 714 performs Walsh code demodulation, and may perform power and signal quality measurements.

A control processor 716 provides much of the processing of the forward link channel, as described below. A memory 718 permanently stores routines performed by the control processor 716, and provides a temporary storage of data such as received frames. A transmitter system 720 encodes, modulates, amplifies and up converts a reverse link traffic data signal for transmission back to the base station 106a.

When setting up the call with the mobile station 102, the base station 106a may transmit information to the mobile station that identifies for the mobile station the phase value provided by the phase rotator 206. The base station 106a may send phase value information to the mobile station 102 (1) when only pilot symbols are given a phase offset, (2) when multiple Walsh code channels are used for one user to carry high data rates, these channels are given different phase offsets, and when pilot symbols on these channels are coherently combined, and (3) when pilot symbols from different Walsh code channels are to be combined and used by the mobile station, and these code channels are given different phase offsets. The control processor 716 may then correct phase changes in received slots based on the previously transmitted phase value. Thus, if the phase value is 180° (ie., –1), then the demodulator in the receiver system 714 of the mobile station 102 multiplies the code by –1 to correct the phase.

In an alternative embodiment, rather than generating a random string of plus and minus one values, the phase rotator 206 generates an ordered sequence of alternating plus and minus one values (i.e., 1, –1, 1, –1, 1, . . . ) which are applied to the new users. This alternative embodiment, and those described herein, are similar to previously described embodiments; only the significant differences are described in detail. The orthogonal code generator 204 of the modulator 200 under this alternative embodiment then randomly assigns orthogonal codes to each new caller. As a result, the phase of orthogonal codes multiplied with pilot symbols remains random, so that random orthogonal codes in the Walsh matrix are inverted (i.e., multiplied by –1).

Figure 8:
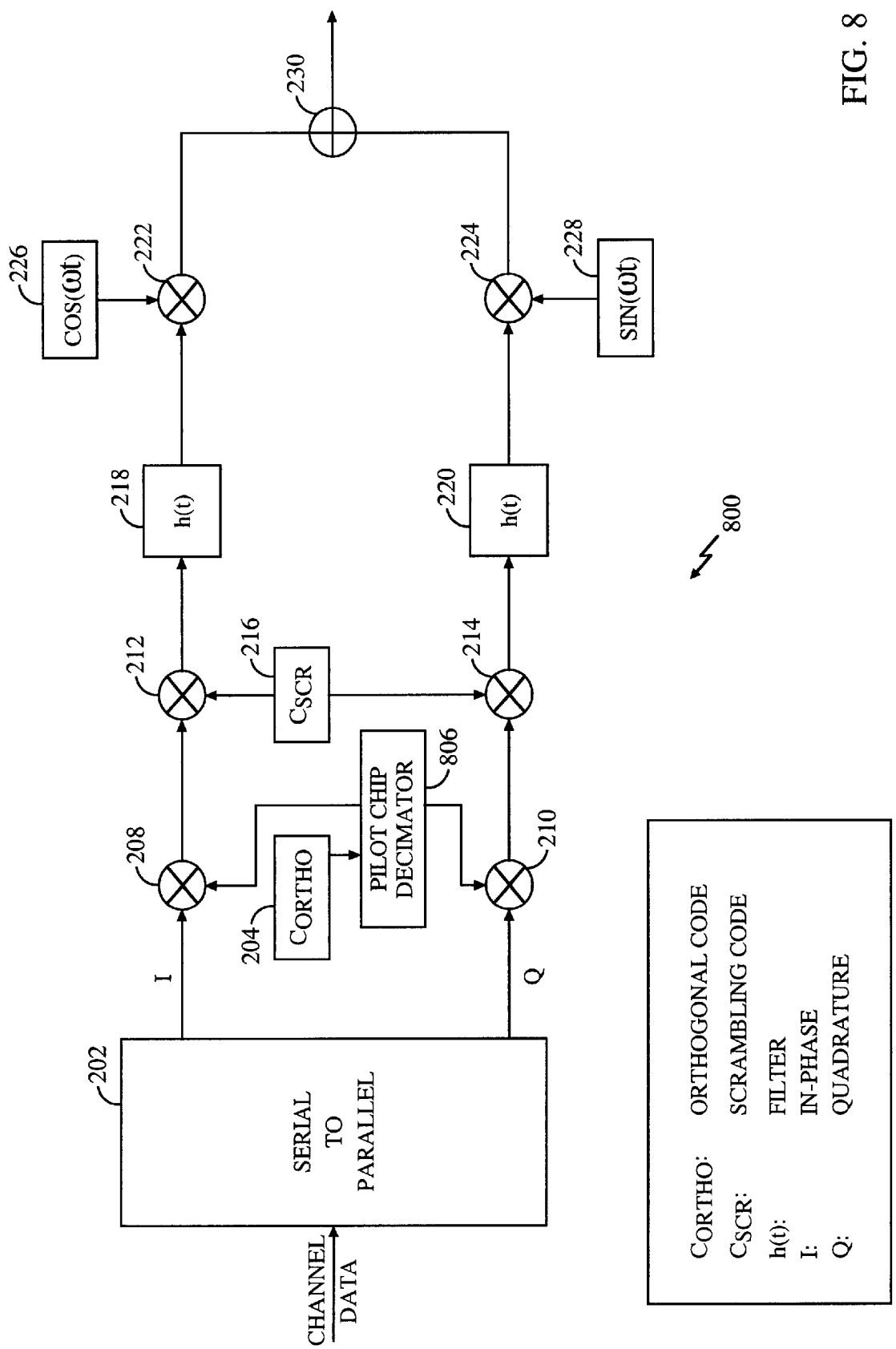
FIG. 8 is a block diagram of a portion of the base station in the wireless communication system of FIG. 1, under a first alternative embodiment, appropriate for the second class of solutions.

In a first depicted alternative embodiment, under a second class of solutions and shown in FIG. 8, an encoder 800 is similar to the encoder 200, but replaces the phase rotator 206 with a pilot chip decimator 806. The chip decimator 806 identifies pilot symbols and eliminates the common sign chip position in the orthogonal codes output from the orthogonal code generator 204 for pilot symbols. Thus, with the Walsh codes in FIG. 3, the chip decimator 806 eliminates the first chip position in such codes (eliminates the chips in column 0). As a result, the encoder 800 sends empty pilot symbols in the first Walsh chip position.

While the orthogonal code generator 204 and chip decimator 806 are shown as separate blocks, these blocks can be combined to form a single orthogonal code generator that outputs orthogonal codes having the common sign chip position eliminated. Alternatively, the orthogonal code generator 204 can be a stored table lacking the common sign chip position for each code. In this alternative, the chip decimator 806 is unnecessary and can be eliminated.

To regain orthogonality, the mobile station 102 replaces the decimated chip in the received symbols in at least one of two ways. First, the mobile station 102 recognizes that, except for the first row, all Walsh codes sum to a value of zero when employing a 1/–1, as opposed to 1/0, notation. Thus, the mobile station 102 can determine a plus or minus one value by observing the sign of the Walsh demodulation. The user station 102 can reconstruct the first chip with the Walsh functions. For example, if all the transmitted Walsh functions would sum to 0 if fully sent, then the user station 102 sums all of the received Walsh functions (without the first chips) over all the Walsh chips. The negative of this sum is the value that the received signal would have had if the Walsh functions were fully transmitted. If one of the Walsh functions did not sum to 0 (for example, all chips were equal to 1), then a first Walsh demodulation of all the received Walsh functions provides simultaneous equations for solving for the first Walsh chip amplitudes. Thus, the control processor 716 of the mobile station 102 analyzes a sum of the received chips to determine the value of the first chip position.

Alternatively, the base station 106a transmits information to the mobile station 102, when initially establishing a new call, that reflects the value of the decimated chip. This method is substantially similar to that described above with respect to FIG. 7.

In an alternative embodiment, the chip decimator 806 is replaced by a common chip attenuator (not shown). The common chip attenuator attenuates the common sign chip position by a selected amount. The value of the selected amount is then transmitted, typically when a new call is set up, to the mobile station 102. The mobile station 102 then boosts or amplifies the common sign chip position by the selected amount to regain orthogonality. This alternative embodiment is a more general application of the first alternative embodiment described above with respect to FIG. 8.

In a second depicted alternative embodiment, under a third class of solutions, pilot symbols are sent and effectively time multiplexed by the base station 106a for concurrent users. Not only does this third class of solutions reduce the peaked average amplitude problem, but also reduces the number of symbols transmitted to thereby reduce interference among transmitted channels. The various users look for pilot symbols at selected times. When users would not be looking for any pilot symbols, the base station 106a does not send any pilot symbols during such times (i.e., during such slots).

Figure 9:
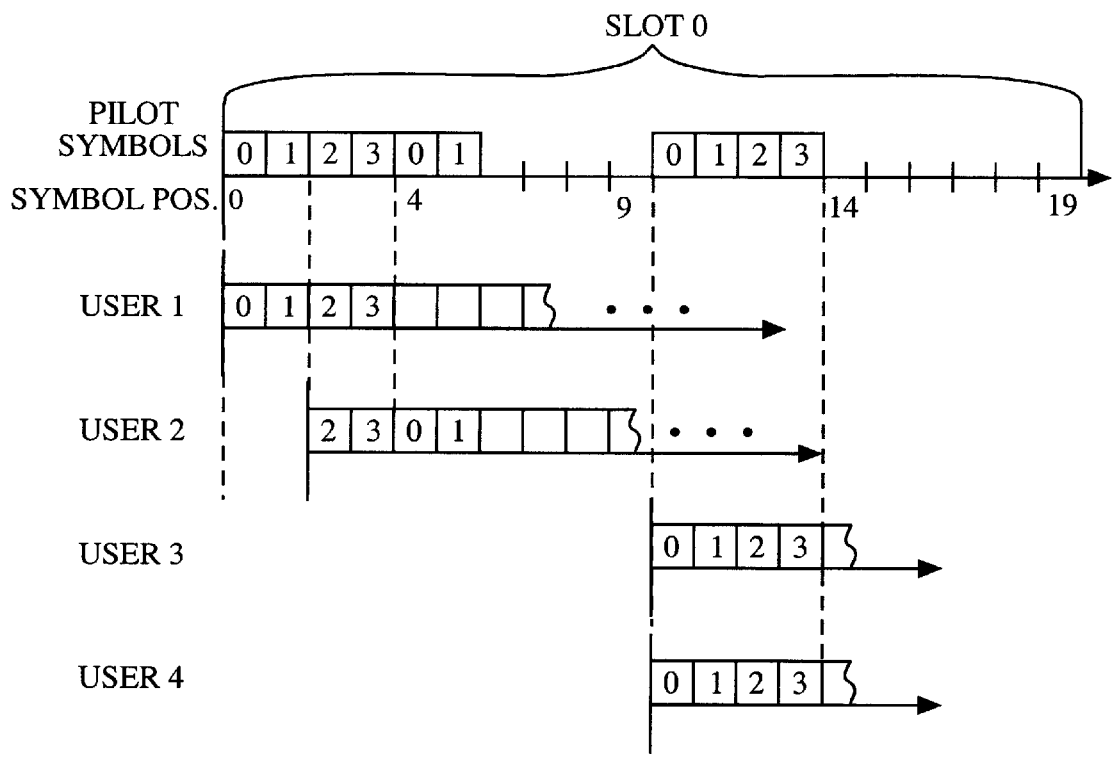
FIG. 9 shows schematic waveform diagrams representing an aspect of a second alternative embodiment.

Assuming, for example, 16 slots per frame, and 20 symbols per slot (and 128 or 256 chip positions per symbol), if each slot includes four pilot symbols 0–3, the base station 106a transmits all four pilot symbols 0–3 in the first four symbol positions 0–3 of a slot 0, as shown in FIG. 9. While the pilot symbols 0–3 are shown in consecutive symbol positions of the slot, they need not be so positioned. User 1 looks for and retrieves the four pilot symbols 0–3 in the symbol positions 0–3. Slots of subsequent users are offset by a fixed number 0 through k of symbol positions. The offsets of slots for users should occur with a resolution equal to one symbol length so that symbol boundaries are aligned.

User 2 is offset by two symbol positions, from user 1, while user 3 is offset by eight symbol positions from user 2 (ten symbol positions from user 1). User 2 looks for and retrieves two of its four pilot symbols in symbol positions 2 and 3 of slot 0. Knowing that user 2 is offset by two symbol positions from the beginning of the slot, the base station 106a inserts two pilot symbols in symbol positions 4 and 5, in which user 2 looks for and obtains such symbols.

Knowing that user 3 is offset by ten symbol positions from the start of the slot, the mobile station 106a inserts the pilot symbols 0–3 in symbol positions 11–14. User 3 therefore looks in symbol positions 11–14 to obtain its pilot symbols. User 4 has the same offset as user 3. Therefore, the base station 106a need not send any additional pilot symbols; user 4 looks in the same symbol positions as user 3 for its pilot symbols.

Importantly, the base station 106a does not transmit any pilot symbols where it knows that its users are not looking for such pilot symbols. Therefore, as shown in FIG. 9, the base station 106a does not transmit any pilot symbols in symbol positions 6–9. Thus, rather than transmitting four symbols for each of the four users in this example (for a total of 16 symbols), the base station 106a transmits only ten symbols for the four users. By sending fewer pilot symbols, the peak to average ratio noted above is reduced. Such a system is possible because the pilot symbols are substantially similar. Moreover, the base station 106a under this second alternative embodiment may employ the same Walsh code for each user for pilot symbols. The base station 106a, however, encodes data to each user with a different Walsh code. The control processor 716 of the mobile station 102 switches between one Walsh code to demodulate the pilot symbols, and another Walsh code to demodulate data traffic.

Possibly more importantly, by simply reducing the number of pilot symbols transmitted, interference among transmitted channels, including traffic channels, is reduced. By failing to transmit pilot symbols during certain symbol positions, power allocated for pilot symbols can be reduced.

Figure 10:
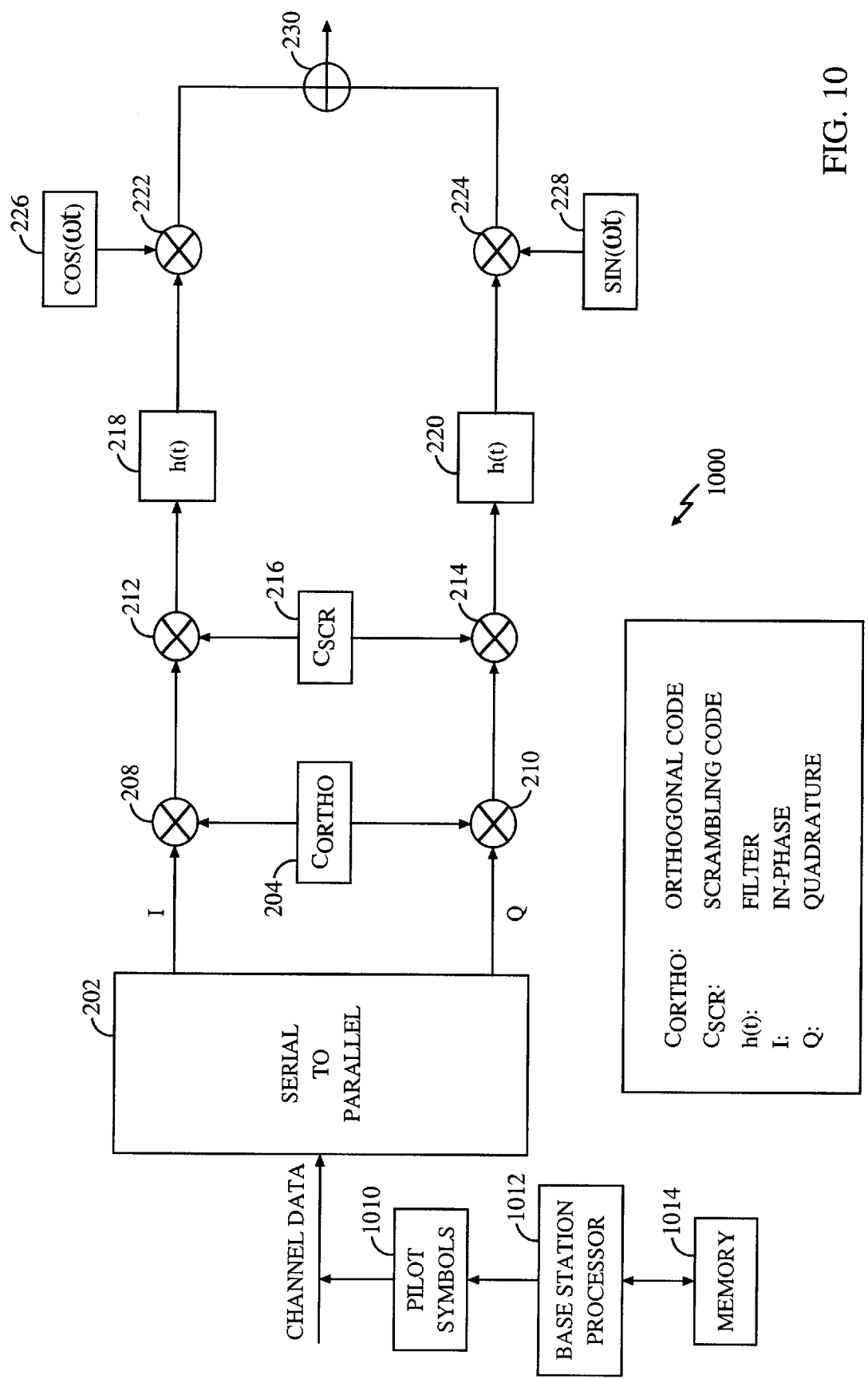
FIG. 10 is a block diagram of a portion of the base station in the wireless communication system of FIG. 1, under a second alternative embodiment, appropriate for the third class of solutions.

Referring to FIG. 10, an encoder 1000 for implementing this second alternative embodiment is similar to the encoder 200, but eliminates the phase rotator 206. The encoder 1000 includes the pilot symbol generator 1010 that provides pilot symbols to the channel data that is input to the serial to parallel converter 202. A base station processor 1012 identifies all users to which the encoder 1000 transmits and determines the symbol positions in each slot that the users will look for pilot symbols. The base station processor 1012 instructs the pilot symbol generator 1010 to only insert pilot symbols in the channel data when users are expected to receive such symbols. Data regarding users can be temporarily stored in a memory 1014. The base station processor 1012 instructs the pilot symbol generator 1010 to not output any pilot symbols in symbol positions that users are not expecting to retrieve such symbols. In sum, the base station processor 1012 determines in which symbol positions to send pilot symbols.

Figure 11:
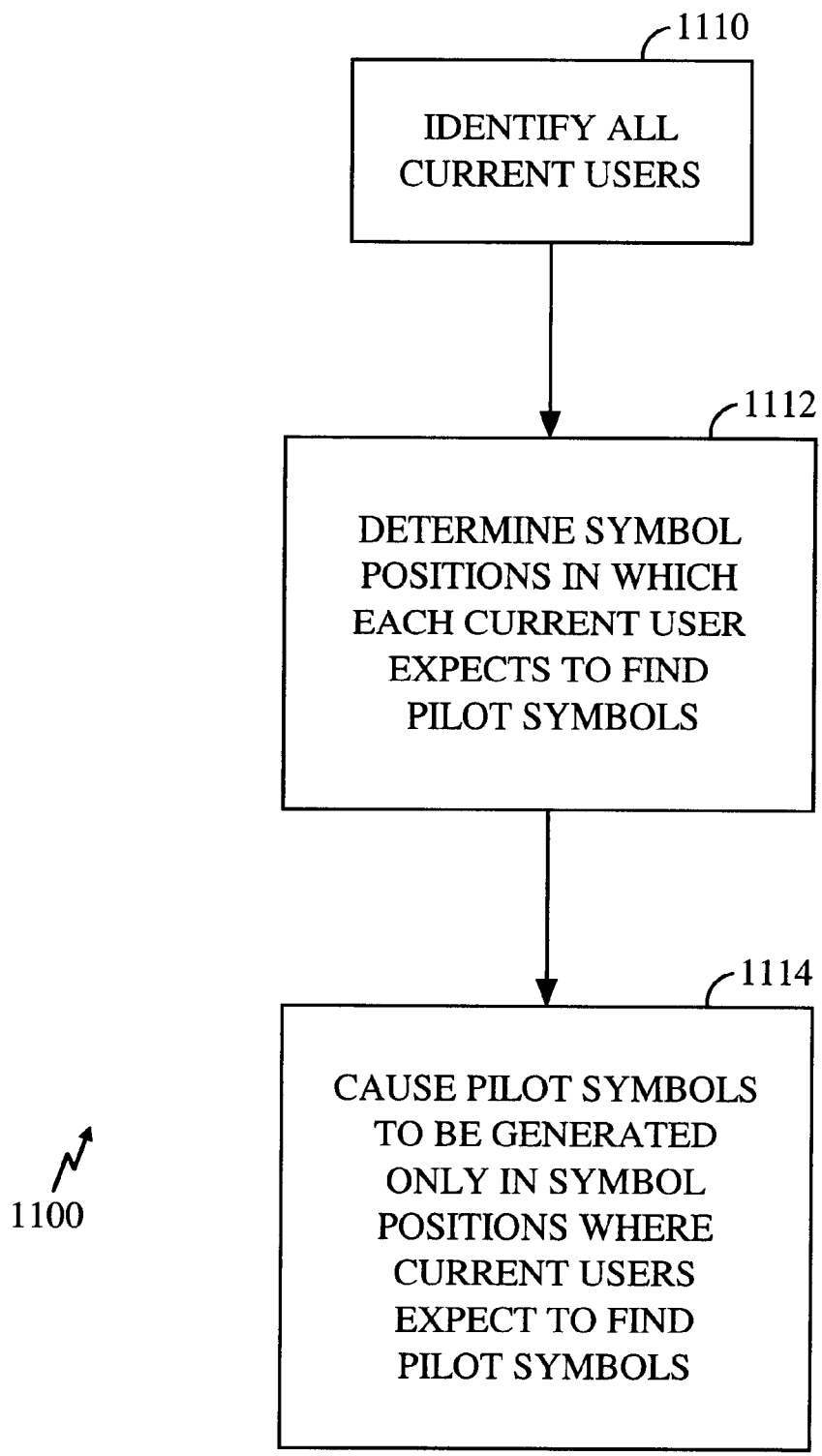
FIG. 11 is an exemplary flow diagram of a method for generating pilot symbols under the second alternative embodiment.

The orthogonal code generator 204 then assigns and multiplies the same Walsh code for all pilot symbols. Alternatively, the base station processor 1012 instructs the orthogonal code generator 204 to generate multiple Walsh codes for pilot symbols. The base station processor 1012 also then causes the encoder 1000 to transmit information to the mobile station 102 so that the mobile station knows which Walsh codes were assigned to pilot symbols. Referring to FIG. 11, a basic routine 1100 performed by the base station processor 1012 under this second alternative embodiment begins in step 1110 by identifying all current users to which the base station 106a transmits. Those skilled in the relevant art can create source code based on the flowchart of FIG. 11 and the detailed description provided herein. The routine 1100 is preferably stored in the memory 1014.

In step 1112, the base station processor 1012 determines symbol positions in which each current user expects to find pilot symbols. In step 1114, the base station processor 1012 provides signals to the pilot symbol generator 1010 to cause pilot symbols to be generated only in symbol positions where current users expect to find pilot symbols. This process may be repeated for each frame.

Figure 12:
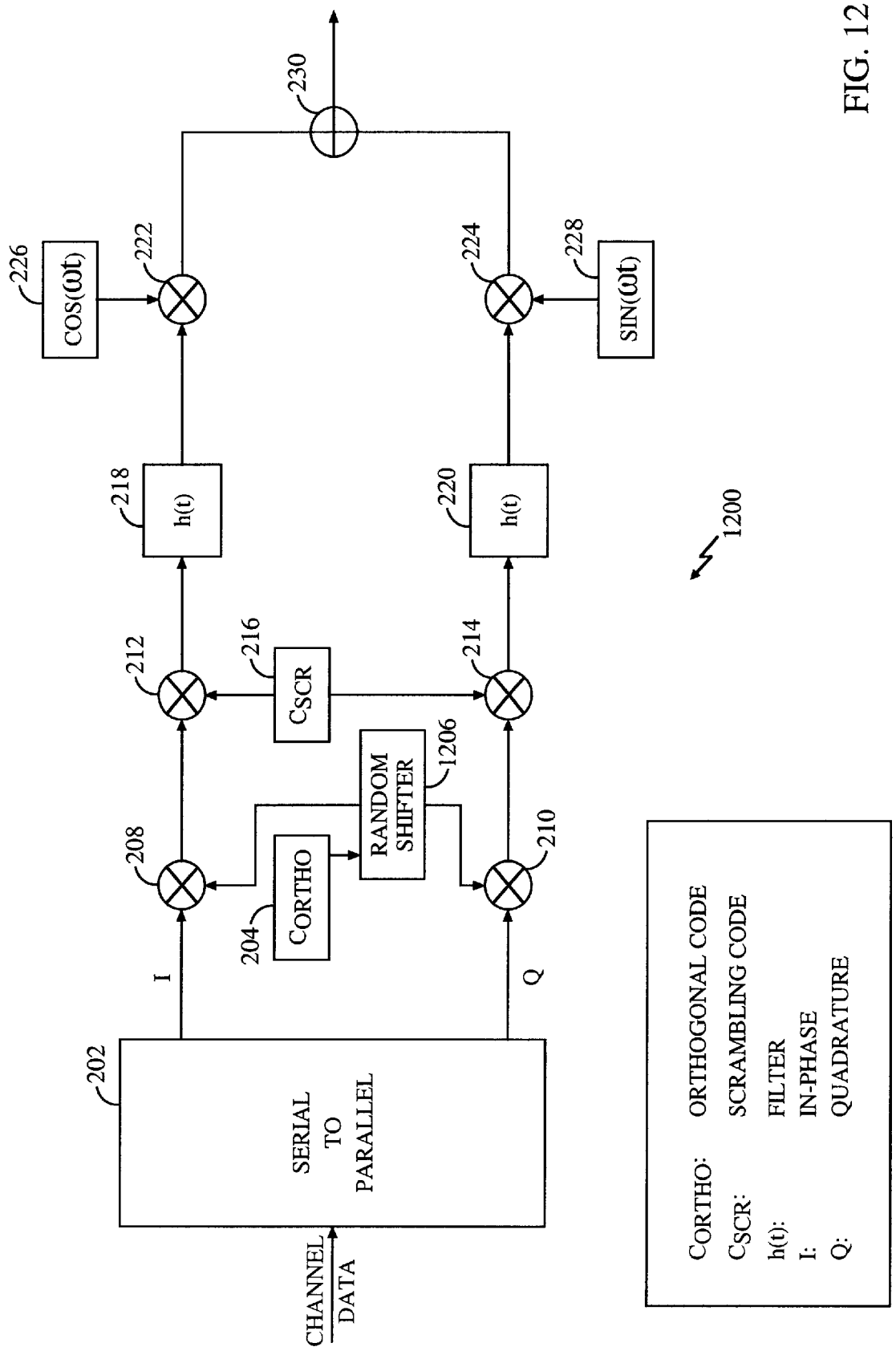
FIG. 12 is a block diagram of a portion of the base station in the wireless communications system of FIG. 1, under a third alternative embodiment, appropriate for the fourth class of solutions.

In a third depicted alternative embodiment, under a fourth class of solutions and shown in FIG. 12, an encoder 1200 is similar to the encoder 200, but replaces the phase rotator 206 with a random shift generator 1206. The random shift generator 1206 randomly shifts each orthogonal code output from the orthogonal code generator 204 by a random number between 0 and n, where n is the $n^{th}$ chip position of the orthogonal code. Thus, with the Walsh matrix of FIG. 3, the random shift generator 1206 offsets each Walsh code by a random amount between 0 and 127. As a result, the common sign chip position (first chip position in FIG. 3) no longer exists since each orthogonal code is randomly shifted. For example, if a first four and last six chip positions of a given Walsh code are 1–1–11 . . . , 1–1–111–1, and the code were shifted rightward by one chip position, the resulting first and last four chip positions are –11–1–1 . . . , –1–111. Note that the chip positions shifted from the right end of the code are positioned at the beginning, left end of the code.

The random shift generator 1206 could be a pseudorandom number generator that randomly generates numbers 0 through 127 for the Walsh matrix of FIG. 3. Again, the orthogonal code generator 204 can be a stored table. Alternatively, the random shift generator 1206 and the orthogonal code generator 204 can be combined as a single circuit that generates orthogonal codes randomly offset by numbers equal to a number of chip positions for the orthogonal code.

The base station 106a transmits not only the shift value for the channel of the mobile station 102, but the shift codes for all users to which the base station transmits. While requiring significant processor overhead for the control processor 716, the mobile station 102 unshifts all channels to regain orthogonality. Thereafter, the mobile station 102 may demodulate and decode its channel.

Although specific embodiments of, and examples for, the invention are described herein for illustrative purposes, various equivalent modifications can be made without departing from the scope of the invention, as will be recognized by those skilled in the relevant art. For example, while many of the above embodiments are shown and described as being implemented in hardware, such embodiments could equally be implemented in software and be performed by a processor. Such software can be stored on any suitable computer-readable medium, such as micro code stored in a semiconductor chip, as computer-readable disk, or downloaded and stored from a server. The various embodiments described above can be combined to provide further embodiments. In general, the orthogonal code altering techniques described in detail above are examples, and those skilled in the relevant art can create similar techniques under the teachings and concepts of the invention.

The teachings provided herein of the invention can be applied to other communication systems, not necessarily the exemplary communication system described above. For example, while the present invention has been generally described above as being employed in the CDMA communication system 100, the present invention is equally applicable to other digital or analog cellular communication systems. While the base station 106a is described above as altering the orthogonal codes or selectively transmitting pilot symbols, such techniques can be applied to a user station. The invention can also be modified, if necessary, to employ the systems, circuits and concepts of the various patents described above, all of which are incorporated by reference.

These and other changes can be made to the invention in light of the above detailed description. In general, in the following claims, the terms used should not be construed to limit the invention to the specific embodiments disclosed in the specification and the claims, but should be construed to include any communication system that operates under the claims to reduce amplitude in, or distortions between, transmitted signals. Accordingly, the invention is not limited by the disclosure, but instead its scope is to be determined entirely by the following claims.

What is claimed is:

1. In a communication system having a base station and a plurality of user stations that exchange communication signals with the base station, a method for reducing transmission signal power of transmitted communication signals, the method comprising:

receiving channel data for transmission on a plurality of channels, wherein the channel data includes pilot symbol data;

combining orthogonal codes with the received channel data, wherein each orthogonal code has at least one common chip position, and wherein the common chip position has a same value for each orthogonal code; and before transmitting the channel data combined with the orthogonal codes, altering the common chip position of at least one of the orthogonal codes to reduce a combined amplitude resulting from simultaneous transmission and addition of the common chip position for the plurality of channels.

2. The method of claim 1 wherein the orthogonal codes are Walsh codes, and wherein the common chip position has a same sign for each Walsh code, wherein altering the common chip position includes multiplying a random value of +1 or −1 to each Walsh code before combining the orthogonal code with the received pilot symbol data, wherein receiving channel data includes receiving channel data for transmission on a plurality of channels to the plurality of user stations, and wherein combining orthogonal codes and altering the common chip position are performed at the base station.

3. The method of claim 1 wherein altering the common chip position includes altering each orthogonal code by a phase value between 0 and 360 degrees.

4. The method of claim 1 wherein altering the common chip position includes sequentially multiplying each orthogonal code by a value selected from the series +1, −1, +1, −1, +1, . . . , but non-sequentially assigning orthogonal codes to each new set of channel data for each new user.

5. The method of claim 1 wherein the orthogonal codes are Walsh codes, wherein the common chip position is a first chip in each Walsh code, and wherein altering the common chip position includes omitting the first chip position in each Walsh code.

6. The method of claim 1 wherein altering the common chip position includes omitting the common chip position in at least some of the orthogonal codes.

7. The method of claim 1 wherein altering the common chip position includes attenuating the common chip position in at least some of the orthogonal codes.

8. The method of claim 1 wherein altering the common chip position includes shifting chip positions of at least some of the orthogonal codes.

9. The method of claim 1, further comprising:

at the base station, transmitting to the user station information regarding the altering of the common chip position; and at the user station removing the alteration of the common chip position.

10. In a communication system having a base station and a plurality of user stations that exchange communication signals with the base station, an apparatus for reducing transmission signal power of transmitted communication signals, the apparatus comprising:

means for receiving channel data for transmission on a plurality of channels, wherein the channel data includes pilot symbol data;

means for combining orthogonal codes with the received channel data, wherein each orthogonal code has at least one common chip position, and wherein the common chip position has a same value for each orthogonal code; and means, coupled to the means for combining, for altering the common chip position of at least one of the orthogonal codes to reduce a combined amplitude resulting from simultaneous transmission and addition of the common chip position for the plurality of channels.

11. The apparatus of claim 10 wherein the orthogonal codes are Walsh codes, and wherein the common chip position has a same sign for each Walsh code, wherein the means for altering the common chip position includes means for multiplying a random value of +1 or −1 to each Walsh code before combining the orthogonal code with the received pilot symbol data, and wherein the means for receiving channel data includes means for receiving channel data for transmission on a plurality of channels to the plurality of user stations.

12. The apparatus of claim 10 wherein the means for altering the common chip position includes altering each orthogonal code, or each orthogonal code as combined with the received channel data, by a phase value between 0 and 360 degrees.

13. The apparatus of claim 10 wherein the means for altering the common chip position includes means for sequentially multiplying each new set of channel data for each new user station by a value selected from the series +1, −1, +1, −1, +1, . . . , but non-sequentially assigning orthogonal codes to each new set of channel data for each new user.

14. The apparatus of claim 10 wherein the orthogonal codes are Walsh codes, wherein the common chip position is a first chip in each Walsh code, and wherein the means for altering the common chip position includes means for omitting the first chip position in each Walsh code.

15. The apparatus of claim 10 wherein the means for altering the common chip position includes means for omitting the common chip position in at least some of the orthogonal codes.

16. The apparatus of claim 10 wherein the means for altering the common chip position includes means for attenuating the common chip position in at least some of the orthogonal codes.

17. The apparatus of claim 10 wherein the means for altering the common chip position includes means for shifting chip positions of at least some of the orthogonal codes.

18. The apparatus of claim 10, further comprising:
means for transmitting to the user station information regarding the altering of the common chip position so that the user station may remove the alteration of the common chip position.

19. In a communication system having a base station and a plurality of user stations that exchange communication signals with the base station, an apparatus for reducing transmission signal power of transmitted communication signals, the apparatus comprising:
an input node that receives channel data for transmission on a plurality of channels, wherein the channel data includes pilot symbol data;
an orthogonal code generator combining orthogonal codes, wherein each orthogonal code has at least one common chip position, and wherein the common chip position has a same value for each orthogonal code; and
a common chip position altering circuit, coupled to the input node and the orthogonal code generator, that alters the common chip position of at least one of the orthogonal codes before combining the channel data combined with the orthogonal codes to reduce a combined amplitude resulting from addition of the common chip position for the plurality of channels.

20. The apparatus of claim 19 wherein the orthogonal codes are Walsh codes, and wherein the common chip position has a same sign for each Walsh code,
wherein the altering circuit includes a multiplier that multiplies a random value of +1 or −1 to each Walsh code before combining the orthogonal code with the received pilot symbol data,
wherein the input node receives channel data for transmission on a plurality of channels to the plurality of user stations, and wherein the code generator and the altering circuit form part of the base station.

21. The apparatus of claim 19 wherein the altering circuit includes a combiner that combines a phase value between 0 and 360 degrees to each orthogonal code or to the orthogonal code as combined with the received channel data.

22. The apparatus of claim 19 wherein the altering circuit includes a multiplier that sequentially multiplies each orthogonal code for each new user station by a value selected from the series +1, −1, +1, −1, +1, . . . , but non-sequentially assigns orthogonal codes to each new set of channel data for each new user.

23. The apparatus of claim 19 wherein the orthogonal codes are Walsh codes, wherein the common chip position is a first chip in each Walsh code, and wherein the altering circuit includes a decimator that omits the first chip position in each Walsh code.

24. The apparatus of claim 19 wherein the altering circuit includes a decimator that omits the common chip position in at least some of the orthogonal codes.

25. The apparatus of claim 19 wherein the altering circuit includes a chip shifting circuit that shifts chip positions of at least some of the orthogonal codes.

26. The apparatus of claim 19, further comprising:
a processor that transmits to the user station information regarding the altering of the common chip position.

27. The apparatus of claim 19 wherein the orthogonal code generator and the altering circuit form a single code generating circuit.

28. The apparatus of claim 19 wherein the orthogonal code generator includes a table of orthogonal codes stored in a memory, and wherein the altering circuit includes a pseudo random number generator.

29. In a communication system having a base station and a plurality of user stations that exchange signals with the base station, an apparatus for reducing transmission signal power of transmitted signals, the apparatus comprising:
an input node that receives data for transmission on a plurality of channels, wherein the data includes pilot symbols;
an altered orthogonal code generator, wherein each of a plurality of unaltered orthogonal codes have at least one common chip position having a same value, and wherein the altered orthogonal code generator alters at least some of the unaltered orthogonal codes by a phase value between 0 and 360 degrees to produce phase altered orthogonal codes; and
a combining circuit that combines at least some of the pilot symbols for some of the plurality of channels with the phase altered orthogonal codes to reduce a combined amplitude resulting from addition of the common chip position for the plurality of channels.

30. The apparatus of claim 29 wherein the plurality of unaltered orthogonal codes are Walsh codes, and wherein the common chip position has a same sign for each Walsh code, and
wherein the altered orthogonal code generator multiplies a random value of +1 or −1 to each Walsh code.

31. The apparatus of claim 29 wherein the altered orthogonal code generator sequentially multiplies each unaltered orthogonal code by a value selected from the series +1, −1, +1, −1, +1, . . . , but non-sequentially assigns phase altered orthogonal codes to each new set of channel data for each new user.

32. The apparatus of claim 29, further comprising:
a transmitter that transmits to the user station information regarding the phase value of the phase altered orthogonal code.

33. The apparatus of claim 29 wherein the altered orthogonal code generator includes a generator that generates the unaltered orthogonal codes, and a random phase generating circuit.

34. The apparatus of claim 29 wherein the altered orthogonal code generator includes a table of unaltered orthogonal codes stored in a memory, and a pseudo random number generator.

35. In a communication system having a base station and a plurality of user stations that exchange signals with the base station, an apparatus for reducing transmission signal power of transmitted signals, the apparatus comprising:
an input node that receives data for transmission on a plurality of channels, wherein the data includes pilot symbols;
an altered orthogonal code generator, wherein each of a plurality of unaltered orthogonal codes has at least one common chip position having a same value, and wherein the altered orthogonal code generator attenuates the common chip position in at least some of the unaltered orthogonal codes to produce altered orthogonal codes; and a combining circuit that combines at least some of the pilot symbols for some of the plurality of channels with the altered orthogonal codes to reduce a combined amplitude resulting from addition of the common chip position for the plurality of channels.

36. The apparatus of claim 35 wherein the plurality of unaltered orthogonal codes are Walsh codes, and wherein the common chip position has a same sign for each Walsh code, and wherein the altered orthogonal code generator eliminates the common chip position in each Walsh code.

37. The apparatus of claim 35, further comprising:

a transmitter that transmits to the user station information regarding an attenuation value of the altered orthogonal code.

38. The apparatus of claim 35 wherein the altered orthogonal code generator includes a generator that generates the unaltered orthogonal codes, and a common chip position decimating circuit.

39. The apparatus of claim 35 wherein the altered orthogonal code generator includes a table of unaltered orthogonal codes stored in a memory.

40. A user station for use in a communication system having a base station and a plurality of other user stations, wherein all of the user stations exchange communication signals with the base station, the user station comprising:

a receiver that receives channel data from one of a plurality of channels, wherein the channel data includes pilot symbol data encoded with one of a plurality of orthogonal codes, wherein each orthogonal code has at least one common chip position, wherein the common chip position has a same value for each orthogonal code, and wherein the common chip position of the one received orthogonal code is altered; and a processor, coupled to the receiver, that returns the altered one received orthogonal code to an original state.

41. The user station of claim 40 wherein the orthogonal codes are Walsh codes, and wherein the common chip position has a same sign for each Walsh code; and wherein the processor determines that the one received orthogonal code was multiplied by a value of +1 or −1.

42. The user station of claim 40 wherein the processor determines that the one received orthogonal code was combined with a phase value between 0 and 360 degrees.

43. The user station of claim 40 wherein the processor determines that the common chip position was eliminated in the one received orthogonal code.

44. The user station of claim 40 wherein processor determines that the chip positions of the one received orthogonal code were shifted.

45. The user station of claim 40 wherein the receiver receives:

information regarding the altering of the common chip position in the one received orthogonal code.

* * * * *